United States Patent [19]

Ferrato

[11] 4,413,884
[45] Nov. 8, 1983

[54] CASTING A THERMOPLASTIC-ALKALI EARTH METAL SALT REFLECTOR TO A LIQUID CRYSTAL DISPLAY

[75] Inventor: Joseph P. Ferrato, Stow, Ohio

[73] Assignee: Eaton Corporation, Cleveland, Ohio

[21] Appl. No.: 301,553

[22] Filed: Sep. 14, 1981

[51] Int. Cl.³ .............................................. G02F 1/13
[52] U.S. Cl. .................................................... 350/338
[58] Field of Search ............... 350/338, 343, 357, 393, 350/394, 349; 524/35, 339 R, 339 F, 2 D

[56] References Cited

U.S. PATENT DOCUMENTS

| 3,655,270 | 4/1972 | Creagh | 350/160 |
|---|---|---|---|
| 3,756,694 | 9/1973 | Soree et al. | 350/160 LC |
| 3,761,350 | 9/1973 | Mujat et al. | 524/35 X |
| 3,837,729 | 9/1974 | Harsch | 350/160 LC |
| 3,857,627 | 12/1974 | Harsch | 350/337 |
| 3,881,809 | 5/1975 | Fergason et al. | 350/338 |
| 3,994,568 | 11/1976 | King et al. | 350/343 |
| 4,013,616 | 3/1977 | Wallace | 524/35 X |
| 4,213,676 | 7/1980 | Kaufman | 350/338 X |
| 4,302,560 | 11/1981 | Becher et al. | 424/35 X |

FOREIGN PATENT DOCUMENTS 2832537 2/1979 Fed. Rep. of Germany ...... 350/338
54-81888 12/1979 Japan .................................. 350/338

Primary Examiner—John K. Corbin
Assistant Examiner—David Lewis
Attorney, Agent, or Firm—C. H. Grace; A. E. Chrow

[57] ABSTRACT

Disclosed is a reflector for use in electro-optical displays utilizing electro-optical materials. The reflector is made from a composition comprising a blend of at least one alkali earth metal salt with a binder such as sodium carboxy methyl cellulose or thermoplastic phenoxy and an amount of solvent sufficient to provide suitable viscosity to permit the reflector to be deposited as a reflector on the display. The reflector composition comprises from about 30% to about 99.9% by weight of the alkali earth metal salt to the weight of binder casted to be adjacent to and directly adhered to the side of the back plate facing away from the electro-optical material and is able to provide a wide reflecting angle in conjunction with maintaining a high contrast ratio between the electrically energized state and the electrically un-energized state of the electro-optical material contained within the display.

50 Claims, 1 Drawing Figure

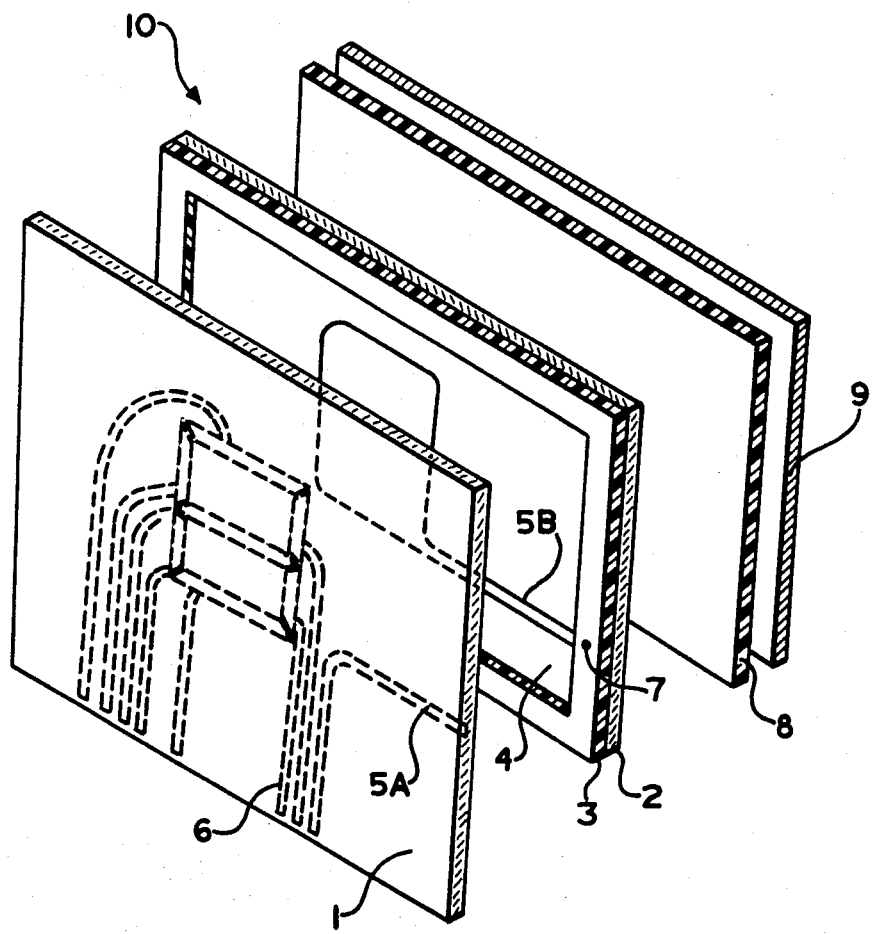

CASTING A THERMOPLASTIC-ALKALI EARTH METAL SALT REFLECTOR TO A LIQUID CRYSTAL DISPLAY

INTRODUCTION

This invention relates generally to electro-optical display devices and more particularly to reflective type electro-optical displays utilizing a reflector that is able to reflect light back through an electro-optical material such as a liquid crystalline material contained within a cavity between two transparent plates of the display.

BACKGROUND OF THE INVENTION

Electro-optical displays that utilize electro-optical materials having an ability to transmit or block light dependent on whether the electro-optical material is in an electrically energized state or an electrically un-energized state have been used for many years.

Reflector plates have also been used for many years in reflective type electro-optical displays as a means of reflecting light back towards a transparent front plate of the display that has entered into the display through the transparent front plate and passed through an electro-optical material contained in the display and through a transparent back plate and impinged upon the reflector.

Reflectors used in the past in electro-optical displays typically feature smooth or roughened metallic surfaces or a diffusing means such as glass spheres imbedded in a hardened transparent medium depending upon the manner in which it is desired to reflect the light. Generally the type of reflection desired is dependent upon the chemical makeup of the electro-optical material contained in the electro-optical display through which the reflected light is transmitted. In some cases it may be desirable to reflect light uniformly in all directions by what are generally called "specular reflectors" of which examples are a mirror or highly polished metal surface. In other cases it may be desirous to reflect light in a selected direction by what are generally called "reflex reflectors".

An example of the use of a specular reflector in the form of a thin metal plate made from aluminum or silver is disclosed in U.S. Pat. No. 3,655,270. An example of utilizing a chromium plate electrode as a specular reflector in an optical display is disclosed in U.S. Pat. No. 3,756,694. Although such reflectors are proported to be of advantage for particular applications they involve the use of expensive silver and chromium and otherwise require the storage and handling of thin metal sheets that are subject to damage and present difficulties in adhering uniformly to the back plate of the optical display in which they are used as well as the undesirable aspect of polished aluminum in being unable to provide a wide reflecting angle.

An example of the use of a roughened metal surface or a composite reflector featuring a transparent diffusing front layer and a rear surface coated with a reflecting film of silver or aluminum is disclosed in U.S. Pat. Nos. 3,837,729 and 3,881,809. Although such reflectors are in common use today, they involve the problems of storage, handling and adherence associated with thin metal films as well as the expense of silver and roughening of metal surfaces and the complexities involved in providing a composite structure involving the combination of transparent diffusing material with a thin metal layer.

An example of the use of a powdered aluminum dispersed in a resin as a reflector in the form of a film coating on the back plate of an optical display is disclosed in U.S. Pat. No. 3,857,627. Such coating however involves the costly use of heavy basic metal material and the requirement of being used in conjunction with a polarizer film.

Heretofore it was believed that high reflectivity white background reflectors made, for example, from aluminum, ceramic or white paint were unsuitable for use in electro-optical displays in that they were only able to provide a fair contrast ratio between the electrically un-energized and energized state of the electro-optical material being used in the particular display. It has been discovered however that this theory is not correct at least in cases where the reflector incorporates an alkali earth metal salt and a binder in conjunction with a whitener or other colorant under such conditions as to enable the reflector to provide a high contrast ratio between the electrically energized and un-energized state of the electro-optical material.

SUMMARY OF THE INVENTION

Accordingly, it is an object of this invention to provide a reflective type electro-optical display that utilizes a reflector that is able to reflect light back through an electro-optical material contained within the display while providing a wide reflecting angle in conjunction with maintaining a high contrast ratio between the electrically energized and electrically un-energized state of the electro-optical material.

It is another object of this invention to provide a reflective type electro-optical display that utilizes a reflector that is made from low cost materials and is easily handled and applied.

It is yet another object of this invention to provide a method of making a reflector for a reflective type electro-optical display that is able to adhere to a transparent back plate of the display and reflect light through an electro-optical material contained within the display while providing a wide reflecting angle in conjunction with maintaining a high contrast ratio between the electrically energized and electrically un-energized state of the electro-optical material.

BRIEF DESCRIPTION OF THE DRAWING

The FIGURE shows an exploded perspective view of an embodiment of the electro-optical display of the invention.

DETAILED DESCRIPTION OF THE INVENTION

The above objects and others have been achieved by providing a reflective type electro-optical display which, in the embodiment shown in the FIGURE, utilizes a reflector comprising an alkali earth metal salt contained in a binder that initially contained a solvent which was caused to be evaporated therefrom during the process of incorporating the reflector into the display.

Shown in the FIGURE is an embodiment of the electro-optical display 10 of the invention. Display 10 has transparent front plate 1 and transparent back plate 2. Plates 1 and 2 are typically made from glass but may be made from other transparent materials such as quartz and the like. Plates 1 and 2 are separated from each other by gasket or seal 3. Seal 3 is made from a dielectric material of high electrical resistance that is able to heremetically bond plates 1 and 2 together and will not contaminate or be contaminated by the electro-optical material used in the display such as, for example, a sintered glass or a thermoplastic phenoxy composition such as disclosed in U.S. Pat. No. 3,994,568. Seal 3 is typically in the order of several microns to about 100 microns in thickness and is relatively uniform in thickness about its perimeter so that plates 1 and 2 are substantially parallel when pressed together with seal 3 therebetween. Plates 1 and 2 respectively have transparent electrically conductive coatings 5A and 5B on their inner facing surfaces made for example from tin oxide or indium oxide. Coating 5A is in the form of a single discrete image comprising a plurality of electrically conductive segments forming the numeral 8 with each segment having a conductive lead that extends towards the edge of plate 1. Coating 5B is in the form of a single discrete image forming a solid conducting area on the surface of plate 2 that aligns with the numeral 8 on plate 1 when plates 1 and 2 are pressed together. By electrifying one or more of the segments comprising the numeral 8 on plate 1 it is possible to form any whole numeral from 0 through nine. Although coatings 5A and 5B are shown in the FIGURE as a single discrete image on plates 1 and 2, such is for illustration only and coatings 5A and 5B may comprise a plurality of images dependent upon the message desired to be displayed by the particular display. Coatings 5A extends toward the edge of plate 1 in the form of leads 6 for connecting coating 5A to a controlled source of electrical power. When plates 1 and 2 are pressed together, plug 7, made from a highly conductive material such as, for example, silver, transfers electrical power from coating 5A to coating 5B on plate 2 to provide a controlled electrical field across plates 1 and 2 when electrical power is delivered to leads 6 on plate 1.

When plates 1 and 2 are pressed together, the inner perimeter of seal 3 defines cavity 4 enclosed by seal 3 between plates 1 and 2 for containing the electro-optical material to be used in the display. In the electro-optical display of the present invention the electro-optical material is preferably in the form of a liquid crystalline material well known in the art such as for example a nematic liquid crystalline material having positive dielectric anistropy or blends of liquid crystalline materials with homologous non-liquid crystalline materials and the like. An electro-optical material found to be of particular advantage for use in display 10 comprises a mixture of at least one cholesteric liquid crystalline material and at least one dichroic dye such as, for example, where the cholesteric material is 4-cyano-(2-methyl)-isobutyl-biphenyl sold by BDH Chemicals Limited of England under the trade notation CB 15 and the dichroic dye is a dye/liquid crystal host solution sold by BDH Chemicals Limited of England under the trade notation D82E63 Blue. Cholesteric liquid crystalline materials are well known in the trade and are characterized by a particular molecular orientation that features a double helical or enantiomorphic structure. Such materials are electrically responsive and will reorient their molecular axis in the presence of a controlled electrical field so as to effectively control the passage of light therethrough between the electrically energized and un-energized state. Generally the term "electro-optical" as used herein means a material suitable for use in electro-optical displays whose ability to transmit light is dependent upon whether the material is in an electrically energized or electrically un-energized state and includes those materials well known in the art such as the nematic liquid crystalline and cholesteric materials described above as well as mixtures of such materials together and with homologous non-liquid crystalline materials. Electro-optical materials such as nematic liquid crystalline materials having positive dielectric anistrophy have the characteristic of aligning their long molecular axis perpendicular to the electric field when electrically energized whereas nematic liquid crystalline materials having negative dielectric anistrophy have the characteristic of aligning their long molecular axis parallel to the electric field when electrically energized.

Disposed adjacent the side of back plate 2 facing away from cavity 4 containing the electro-optical material is reflector layer 8. Reflector 8 reflects light towards plate 1 that has passed through plate 2 and the electro-optical material contained in cavity 4 and impinged on the surface of reflector 8 facing plate 2 after having entered into cavity 4 through plate 1. Reflector 8 may be secured to plate 2 by any suitable method after it has been formed provided that the method does not adversely affect the high contrast ratio associated with reflector 8. The hereinafter described preferred method is to adhere reflector 8 directly to plate 2 by casting and more preferably by silk screen casting reflector 8 directly upon the side of plate 2 facing away from the electro-optical material contained in cavity 4.

Disposed adjacent the side of reflector 8 facing away from plate 2 is protective layer 9. Layer 9 may be made of any suitable material that is able to be secured to display 10 and protect reflector 8 from damage or contamination from vapors such as moisture and the like. It has been found however that in many instances layer 9 is not required and thus the electro-optical display of the present invention includes embodiments that do not incorporate a protective layer 9.

Reflector 8 is made from a composition comprising a blend of at least one alkali earth metal salt with a mixture of at least one solvent and a binder. Alkali earth metals are well known in the art and include barium, magnesium, strontium, calcium, beryllium and the like and are distinctive from heavier metals such as aluminum, copper, silver and the like. It has been found that when an effective amount of an alkali earth metal salt such as barium sulfate or magnesium carbonate or titanium oxide are bound by a binder and solvent mixture, and when the solvent is evaporated, a reflector plate is provided that is able to satisfactorily reflect light towards front plate 1 that has entered through plate 1 and passed through the electro-optical material contained in cavity 4 and through plate 2 and impinged upon the surface of reflector 8 adjacent plate 2. It has been further found that reflector 8 made from a composition comprising a blend of an effective amount of at least one alkali earth metal salt with a mixture of at least one solvent and a binder is suprisingly able to provide a wide reflecting angle in conjunction with maintaining a high contrast ratio of reflected incident light between the electrically energized and electrically un-energized states of an electro-optical material such as a twisted nematic liquid crystal mixture having positive dielectric anistrophy and particularly when used in conjunction with an electro-optical material comprising at least one cholesteric liquid crystalline material and at least one dichroic dye. It has been further found that polarizer plates are not required for electro-optical displays of the present invention that utilize cholesteric phase change materials as the electro-optical material.

Generally, the alkali earth metal salt may comprise from about 30% to about 99.9% by weight of the binder with sufficient amounts of a suitable solvent added to provide the desired viscosity characteristics for depositing the composition on the side of plate 2 facing away from cavity 4. An example of a preferred composition from which reflector 8 is formed is where an effective amount of at least one alkali earth metal salt is mixed with sodium carboxyl methyl cellulose as a binder and water as a solvent with a suitable colorant such as the whitener sold by Aldrich Chemical Company under the trade notation Acid Blue 45. A particularly effective composition for making a reflector 8 having a high contrast ratio that is able to be deposited on plate 2 by coating is where a mixture comprising about 2% by weight of carboxy methyl cellulose binder and about 98% by weight magnesium carbonate is blended at about 33% by weight to the total weight of water where the percent by weight of the binder may be effectively increased to levels as high as 70% provided that the concentration of the magnesium carbonate remains high enough to maintain the high contrast ratio of the optical reflectivity characteristics between the electrically energized and electrically un-energized state of the electro-optical material heretofore described.

Another example of a preferred composition from which reflector plate 8 can be made is where from about 30% to about 99.9% by weight of an alkali earth metal salt such as magnesium carbonate is blended with a mixture of a suitable solvent and a thermoplastic or a thermoset material that does not inhibit the ability of the alkali earth metal salt from acting as a reflector such, as for example, where the thermoplastic material is a thermoplastic phenoxy such as sold under grade type PKHJ by Union Carbide Corporation and a suitable solvent. Although not required, at least one epoxy resin may be mixed with the thermoplastic phenoxy such as disclosed in U.S. Pat. No. 3,994,568, the disclosure of which is incorporated herein by reference, where such is desired. Although other commercially available solvents or mixtures of solvents such as butyl cellusolve may be used, a solvent found particularly useful for such thermoplastic phenoxy is diethylene-glycol diethyl ether. Of particular advantage is where two epoxies having different epoxide equivalent weights are blended with the thermoplastic phenoxy such as where one of the epoxy resins is a solid and the other is a liquid at ambient temperature or where one epoxy resin has an epoxide equivalent weight of from 450 to 550 and the other epoxy has an epoxide equivalent weight of from 2500 to 4000. Additionally, the thermoplastic phenoxy may be converted to a thermoset material where desired by adding a sufficient amount of a suitable crosslinking agent such as ethyl methyl imidizole and curing the composition under suitable heat during the process of evaporating the solvent from the composition.

Although reflector layer 8 of the present invention may be made by casting it separately and then securing it by some suitable manner to the side of back plate 2 facing away from the hereinbefore described electro-optical material disposed in cavity 4, a preferred method is where a composition is provided by blending from about 75% to about 98% by weight of at least one alkali earth metal salt with a mixture of at least one solvent and a binder, such as the hereinbefore described carboxy methyl cellulose-water or the thermoplastic phenoxy solvent binders, such that the composition is imparted with the hereinbefore described high contrast ratio characteristic desired along with a wide reflecting angle and the ability to adhere directly to the side of back plate 2. The composition is then deposited upon the side of back plate 2 facing away from cavity 4 by silk screening reflector 8 onto back plate 2 or by other suitable methods and evaporating the solvent in such a manner such as for example by the application of an amount of heat that will not damage the optical display nor interfere with the ability of reflector 8 to adhere to the side of back plate 2 nor interfere with the ability of reflector 8 to provide a wide reflecting angle in conjunction with maintaining a high contrast ratio between incident light that is reflected during the electrically un-energized and energized states of the hereinbefore described electro-optical material disposed in cavity 4 of the electro-optical display of the present invention. It has been found, for example, that the water in the alkali earth metal salt-carboxy methyl cellulose-water composition and the diethylene-glycol diethyl ether in the thermoplastic phenoxy-alkali earth metal salt-diethylene-glycol diethyl ether composition can be evaporated from the composition by exposing the compositions to heat in the order of about 70° C. for about one-half hour. In instances where it is desired to protect reflector 8 from damage and contaminates such as water and the like, the hereinbefore described protective layer 9 may be disposed by any suitable manner on the side of reflector 8 facing away from the electro-optical material contained in cavity 4.

What is claimed is:

1. An electro-optical display comprising:
   a front and back transparent plate disposed substantially parallel to each other;
   an electro-optical material disposed between the plates, said electro-optical material having an ability to transmit light that depends on whether the electro-optical material is in an electrically energized or an electrically un-energized state;
   a layer of transparent electrically conductive material disposed on at least a portion of the side of each of the plates facing toward the electro-optical material as a means of imposing a controlled electrical field thereacross and electrically energizing the electro-optical material;
   a reflector layer coasted on the side of the back plate facing away from the electro-optical material wherein said reflector layer is disposed adjacent to and adhered directly to the side of the back plate facing away from the electro-optical material, said reflector layer formed from a composition comprising a blend of from about 30% to about 99.9% by weight of at least one alkali earth metal salt with a mixture of at least one solvent and binder mixed in such amounts as to enable the composition to be cast as the reflector and upon evaporation of the solvent to bind the alkali earth metal salt sufficiently to provide said reflector layer with the ability to reflect light back towards the front plate that enters through the front plate and passes through the electro-optical material and the back plate and impinges upon the reflector while providing a high reflecting angle in conjunction with maintaining a high contrast ratio between the electrically energized state and electrically un-energized state of the electro-optical material.

2. The electro-optical display of claim 1 wherein the binder is sodium carboxy methyl cellulose.

3. The electro-optical display of claim 1 wherein the solvent is water.

4. The electro-optical display of claim 1 wherein the binder is sodium carboxy methyl cellulose and the solvent is water.

5. The electro-optical display of claim 4 wherein the metal salt comprises from about 90% to about 98% by weight to the weight of the binder.

6. The electro-optical display of claim 4 wherein the amount of the sodium carboxy cellulose is mixed at about 2% by weight with about 98% by weight of the alkali earth metal salt and the resultant mixture is blended at about 33% by weight to the weight of the water.

7. The electro-optical display of claim 1 wherein the metal salt is barium sulfate.

8. The electro-optical display of claim 1 wherein the metal salt is magnesium carbonate.

9. The electro-optical display of claim 1 wherein the metal salt is titanium oxide.

10. The electro-optical display of claim 1 wherein the binder is a thermoplastic material.

11. The electro-optical display of claim 1 wherein the binder is a thermoset material.

12. The electro-optical display of claim 10 wherein the thermoplastic material is a thermoplastic phenoxy resin.

13. The electro-optical display of claim 12 wherein the thermoplastic phenoxy resin is converted to a thermoset material by incorporation of a suitable amount of a crosslinking agent into the composition.

14. The electro-optical display of claim 12 or 13 wherein the solvent is diethylene-glycol diethyl ether.

15. The electro-optical display of claim 12 or 13 wherein the binder includes at least one epoxy resin.

16. The electro-optical display of claim 15 wherein the binder has two epoxy resins having different epoxide equivalent weights.

17. The electro-optical display of claim 16 wherein one of said epoxy resins has an epoxide equivalent weight from 2500 to 4000 and the other epoxy resin has an epoxide equivalent weight from 450 to 550.

18. The electro-optical display of claim 16 wherein at least one of the epoxy resins is a liquid at room temperature.

19. The electro-display of claim 13 wherein the crosslinking agent is ethyl methyl imidizole.

20. The electro-optical display of claim 1 including a protective layer disposed on the side of the reflector layer facing away from the electro-optical material.

21. The electro-optical display of claim 1 wherein the reflector layer composition includes a whitener.

22. The electro-optical display of claim 1 wherein the reflector layer composition includes at least one colorant.

23. The electro-optical display of claim 1 where in the electro-optical material is a nematic liquid crystalline material.

24. The electro-optical display of claim 24 wherein the nematic liquid crystalline material has a positive dielectric anistrophy.

25. The electro-optical display of claim 24 wherein the nematic liquid crystalline material has a negative dielectric anistrophy.

26. The electro-optical display of claim 1 wherein the electro-optical material comprises a mixture of at least one cholesteric material and at least one dichroic dye with said cholesteric material in an electrically un-energized state able to change to a nematic phase material when in an electrically energized state.

27. In a method of making a reflector layer for an electro-optical display having an electro-optical material disposed between substantially parallel aligned transparent front and back plates of the display and having a transparent electrically conductive layer disposed on at least a portion of the side of both of said plates facing towards said electro-optical material as a means of imposing a controlled electrical field thereacross and changing said electro-optical material from an electrically un-energized state to an electrically energized state, the method including the steps of:

(a) providing a composition comprising a blend of from about 30% to about 99.9% by weight of at least one alkali earth metal salt with a mixture of at least one solvent and binder mixed in such amounts as to bind the metallic salt and enable the composition to be cast as a layer having the ability to adhere to the side of the back plate facing away from the electro-optical material and to reflect light back towards the front plate that enters through the front plate and passes through the electro-optical material and the back plate and impinges upon the side of the reflector facing towards the electro-optical material while providing a high reflecting angle in conjunction with maintaining a high contrast ratio between the electrically un-energized state and the electrically energized state of the electro-optical material;

(b) casting the composition of step (a) onto the side of the back plate facing away from the electro-optical material; and (c) evaporating the solvent under conditions that will neigher damage the display nor interfere with the adherence of the reflector layer to the back plate nor interfere with the ability of the reflector layer to reflect light towards the front plate while providing the wide reflecting angle in conjunction with maintaining the high contrast ratio between the electrically un-energized and the electrically energized states of the electro-optical material.

28. The method of claim 28 including the step of disposing a protective layer on the side of the reflector layer facing away from the electro-optical material subsequent to step (c).

29. The method of claim 27 wherein the metal salt is barium sulfate.

30. The method of claim 27 wherein the metal salt is magnesium carbonate.

31. The method of claim 27 wherein the metal salt is titanium oxide.

32. The method of claim 27 wherein the binder is sodium carboxy methyl cellulose.

33. The method of claim 27 wherein the solvent is water.

34. The method of claim 27 wherein the binder is sodium carboxy methyl cellulose and the solvent is water.

35. The method of claim 34 wherein the sodium carboxy methyl cellulose is mixed at about 2% by weight with about 98% by weight of the alkali earth metal salt and the resultant mixture is blended at about 33% by weight to the weight of the water.

36. The method of claim 34 wherein the metal salt comprises from about 90% to about 98% by weight to the weight of the binder.

37. The method of claim 27 wherein the binder is a thermoplastic material.

38. The method of claim 27 wherein the binder is a thermoset material.

39. The method of claim 37 wherein the thermoplastic material is a thermoplastic phenoxy resin.

40. The method of claim 39 wherein the thermoplastic phenoxy resin is converted to a thermoset material by incorporation of a suitable amount of a crosslinking agent into the composition.

41. The method of claim 39 or 40 wherein the binder includes at least one epoxy resin.

42. The method of claim 39 or 40 wherein the solvent is diethylene-glycol diethyl ether.

43. The method of claim 41 wherein the binder has two epoxy resins having different epoxide equivalent weights.

44. The method of claim 43 wherein one of said epoxy resins has an epoxide equivalent weight from 2500 to 4000 and the other epoxy resin has an epoxide equivalent weight of from 450 to 550.

45. The method of claim 43 wherein one of said epoxy resins is a liquid at ambient temperature.

46. The method of claim 40 wherein the crosslinking agent is ethyl methyl imidizole.

47. The method of claim 27 wherein the electro-optical material includes a whitener.

48. The method of claim 27 wherein the electro-optical material includes at least one colorant.

49. The method of claim 27 wherein the electro-optical material is a neamtic liquid crystalline material.

50. The method of claim 27 wherein the electro-optical material comprises a blend of at least one cholesteric material and at least one dichroic dye with the cholesteric material in an electrically un-energized state about to change to a nematic phase material when in an electrically energized state.

* * * * *